United States Patent [19]

Child et al.

[11] 4,289,287

[45] Sep. 15, 1981

[54] FIXED SKEWED WING AIRBORNE VEHICLE

[75] Inventors: Richard D. Child, Huntington Beach, Calif.; Jan R. Tulinus, Newport News, Va.

[73] Assignee: The Unites States of America as represented by the Secretary of the Air Force, Washington, D.C.

[21] Appl. No.: 807,618

[22] Filed: Jun. 17, 1977

Related U.S. Application Data

[63] Continuation-in-part of Ser. No. 621,330, Oct. 10, 1975, abandoned.

[51] Int. Cl.³ .................................................. B64C 3/10
[52] U.S. Cl. ................................................... 244/45 R
[58] Field of Search .............. 244/13, 15, 35 R, 35 A, 244/45 R, 45 A, 46

[56] References Cited

U.S. PATENT DOCUMENTS

| D. 163,819 | 7/1951 | Risico | 244/13 |
| 3,737,121 | 6/1973 | Jones | 244/13 |

FOREIGN PATENT DOCUMENTS

| 496441 | 11/1919 | France | 244/45 R |

OTHER PUBLICATIONS

Jones R. T., "Aerodynamics for Supersonic Speeds", *Advances in Aero. Sci.*, Sep. 1958, vol. 1, pp.34–50.
Kucheman, "Aircraft Shapes and Their Aerodynamics for Flight at Supersonic Speeds", *Adv. in Aero Sci.*, vol. 3, 1960, pp. 221–252.
Nayler, *Dictionary of Aeronautical Engineering*, PTO, pp. 9 and 269.

*Primary Examiner*—Galen L. Barefoot
*Attorney, Agent, or Firm*—Donald J. Singer; Arsen Tashjian

[57] ABSTRACT

Improvement to a fixed-wing airborne vehicle which results in significant delay drag rise well into the transonic regime. The fundamental features of the improvement include: fixedly skewing the wings at 45 degrees; shaping the outboard ends of the wing tips so that the trailing edge of the forwardly disposed wing is swept forwardly and the leading edge is straight relative to the trailing edge, and so that the leading edge of the rearwardly disposed wing is swept rearwardly and the trailing edge is straight relative to the leading edge; and, blending the leading and the trailing edges of the planform, so as to increase the local chord and control the longitudinal position of the maximum thickness in the root area (i.e., at the interface of the inboard tip end of each wing with the fuselage).

1 Claim, 1 Drawing Figure

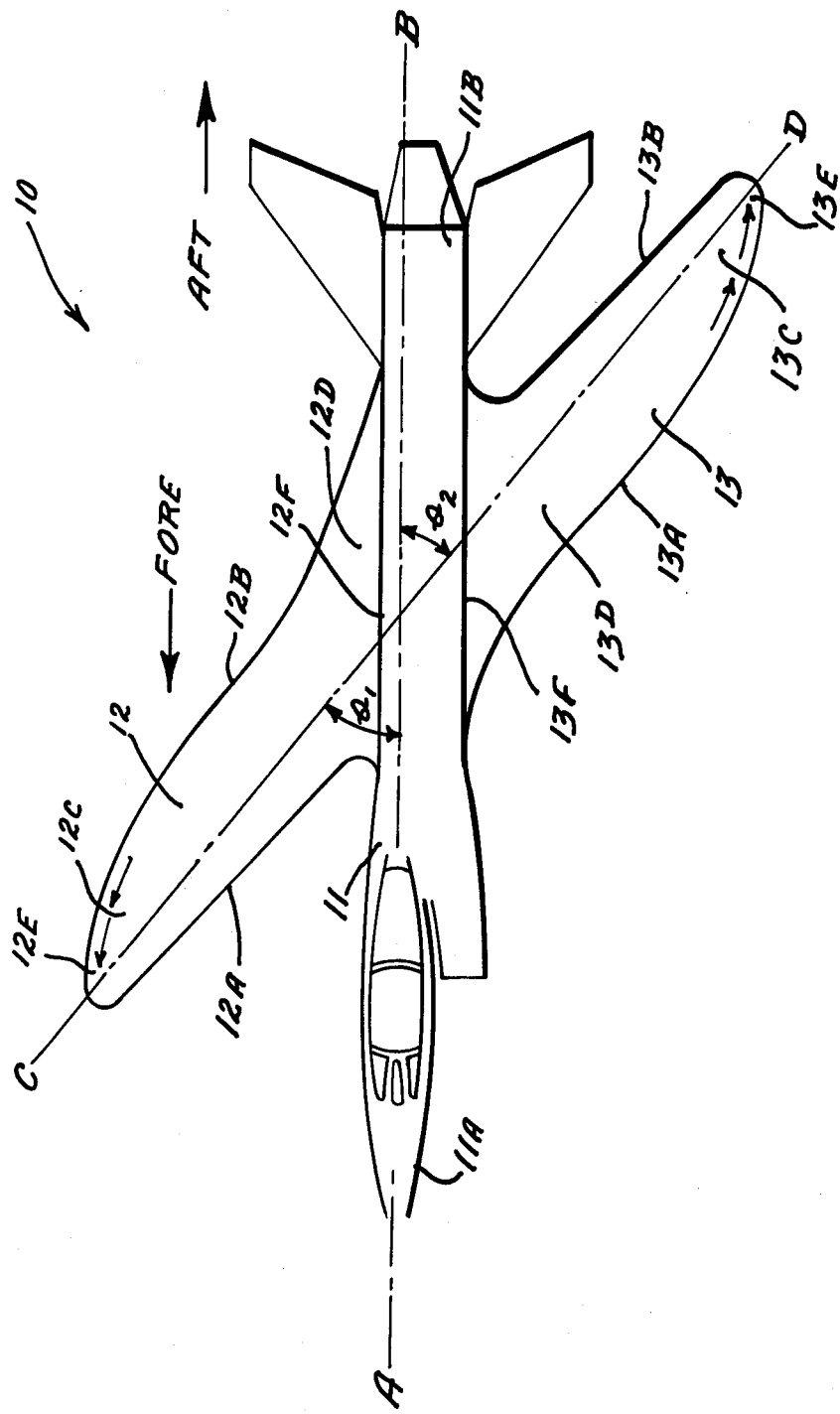

FIXED SKEWED WING AIRBORNE VEHICLE

STATEMENT OF GOVERNMENT INTEREST

The invention described herein may be manufactured and used by or for the Government for governmental purposes, without the payment of any royalty thereon.

CROSS REFERENCE TO RELATED APPLICATION

This application is a continuation-in-part of U.S. Pat. Application Ser. No. 621,330, filed Oct. 10, 1975, now abandoned.

BACKGROUND OF THE INVENTION

This invention relates to improvements in, to, and of airborne vehicles of the fixed wing type and, more particularly, to the wing(s) thereof.

As a preliminary matter, it is to be noted that the term "airborne vehicle", as used herein, is intended to mean a vehicle, craft, structure or the like, which is capable of airborne flight. Such airborne vehicles may include, but are not limited to, airplanes, gliders, and drones; and, such vehicles may also include missiles, spacecraft, and the like, when they are within the atmosphere.

It is also to be noted that, in the interest of simplicity, our inventive improvements will be shown as incorporated in only one preferred embodiment adapted specifically for use with an airplane having a mid-wing configuration. This adaptation is solely by way of illustration, and not by way of any limitation.

It is a continuing goal in the airborne vehicle art to delay drag rise to as high a Mach number as possible. In the prior art, a drag rise delay to Mach number 1.1 has been attained with symmetrical fixed-wing type airplanes.

Our invention significantly advances the state-of-the-art by delaying drag rise of fixed-wing airborne vehicles to a Mach number of 1.4, a new height in the art.

SUMMARY OF THE INVENTION

This invention pertains to inventive improvements of fixed wing type airborne vehicles capable of flight at supersonic speeds.

The principal object of this invention is to teach the structure of a fixed-wing airborne vehicle whereby drag rise is delayed well into the transonic regime (e.g., approximately to Mach number 1.4).

This principal object, as well as other equally important and related objects, of our invention will become readily apparent after a consideration of the description of our invention, coupled with reference to the drawing.

DESCRIPTION OF THE DRAWING

The drawing is a top plan view, in simplified form, of a fixed-wing airborne vehicle of the airplane type, wherein the airplane is intended for, and is capable of, flight at supersonic speeds, and also wherein the fixed-wing airplane incorporates, as a preferred embodiment, the unique features of our invention.

DESCRIPTION OF THE PREFERRED EMBODIMENT

With reference to the drawing, therein is shown the structure of a preferred embodiment 10 of our invention in planform, as it applies to an airborne vehicle of the fixed-wing airplane type which is intended for flight at supersonic speeds.

It is reiterated here that, solely as a matter of preference, and not of limitations, the fixed-wing airplane 10 depicted in the drawing is of the midwing type.

The fixed-wing airplane 10, includes: a fuselage 11 which, in turn, has a longitudinal axis A-B; a nose section, generally designated 11A; a tail section, generally designated 11B; a starboard wing section 12 (hereinafter referred to as the "starboard wing") which further includes a leading edge 12A, a trailing edge 12B, an outboard end 12C, an inboard end 12D, a wing tip 12E at the outboard end 12C, and root area 12F at the inboard end 12D; a port wing section 13 (hereinafter referred to as the "port wing") which further includes a leading edge 13A, a trailing edge 13B, an outboard end 13C, an inboard end 13D, a wing tip 13E at the outboard end 13C, and root area 13F at the inboard end 13D; and, a span-wise axis C-D which is common to both the starboard wing 12 and the port wing 13.

The starboard wing 12 and the port wing 13 are fixedly disposed, so that the span-wise axis C-D which is common to them (i.e., 12 and 13) is also in a skewed (i.e., yawed, slanted, or oblique) relationship to the longitudinal axis A-B, with the result that one wing (i.e., the starboard wing 13 in this case) is disposed fore and the other wing (i.e., the port wing 12 in this case) is disposed aft. An angular skew of 45 degrees is preferred (i.e., $\theta_1 = \theta_2 = 45$ degrees). Stated another way, it is preferred that the span-wise axis C-D which is common to fixed wings 12 and 13 be skewed at an angle of 45 degrees to the longitudinal axis A-B.

It is to be noted: that, with reference to the forwardly disposed wing (i.e., the starboard wing 12 in this case), the trailing edge 12B is swept forwardly at the outboard wing tip 12E, as indicated by the directional arrows in that general location, while the leading edge 12A is essentially straight relative to the trailing edge 12B and, that, with reference to the rearwardly disposed wing (i.e., the port wing 13 in this case), the leading edge 13A is swept rearwardly, as indicated by the directional arrows in that general location, while the trailing edge 13B is essentially straight relative to the leading edge 13A.

It is also to be noted that, with reference to the root area 12F and 13F of both wings 12 and 13, the leading edges 12A and 13A and the trailing edges 12B and 13B are blended at said root areas 12F and 13F of the planform so as to increase the local chord and control the longitudinal position of the maximum thickness in the root area(s) 12F and 13F.

MANNER OF OPERATION OF THE PREFERRED EMBODIMENT

The manner of operation of the preferred embodiment 10 of our inventive improvement can easily be ascertained, understood, and appreciated, by any person skilled in the art, from the foregoing description, coupled with reference to the drawing.

For others, it is sufficient to say in explanation that the skewed relationship of the fixed wings 12 and 13 to the fuselage 11, and that the sweeping of the wing tips 12E and 13E, coupled with the straightness of leading edge 12A and of trailing edge 13B, and also that the blending of the root areas 12F and 13F to the fuselage, collectively result in a longer delay speedwise in the rise of "drag", which is the resistance of the air to an object moving through it, until the airplane 10 reaches a higher Mach number (i.e., a higher speed, as compared to the speed of sound). Increasing this delay in drag rise, as we have done with our inventive improvement, is a continuing goal in the airbone vehicle art.

CONCLUSION

It is abundantly clear from all of the foregoing, and from the drawing, that the stated and desired principal objective of our invention has been attained.

It is to be noted that, although there have been described and shown the fundamental and unique features of our inventive improvement as applied to a particular preferred embodiment, various other embodiments, adaptations, substitutions, additions, omissions, and the like will occur to, and can be made by, those of ordinary skill in the art, without departing from the spirit of the invention. For example, the axis C-D (and, thereby, wings 12 and 13) could be skewed in relationship to axis A-B so that $\theta_1 = \theta_2 = 135$ degrees, as long as the other fundamentals of the inventive improvement are also modified.

What is claimed is:

1. In an airborne vehicle of the fixed-wing type intended for use at supersonic speeds, wherein said airborne vehicle has a fuselage with a longitudinal axis, a starboard wing section, a port wing section, and a span-wise axis common to both said wing sections, and wherein each said wing section has a leading edge, a trailing edge, an outboard end, and an inboard end, and also wherein each said wing section has a tip at said outboard end and a root area at said inboard end, the improvement comprising:

(a). said wing sections fixedly disposed, with said starboard wing section disposed fore and said port wing section disposed aft, and with said common span-wise axis of said starboard and said port sections disposed in a skewed position at an angle of 45 degrees to said longitudinal axis of said fuselage;

(b). said leading edge and said trailing edge of each said wing section, at said root area thereof, configurated to blend with and to said fuselage;

(c). and, said tip of said fore disposed starboard wing section is so configurated that said trailing edge thereof is swept forwardly and said leading edge thereof is essentially straight relative to said trailing edge and said tip of said aft disposed port wing section is so configurated that said leading edge thereof is swept rearwardly and said trailing edge thereof is essentially straight relative to said leading edge.

* * * * *